United States Patent [19]
Arai

[11] Patent Number: 5,585,053
[45] Date of Patent: Dec. 17, 1996

[54] METHOD OF CONTROLLING A MOVABLE MEMBER IN A MOLDING MACHINE

[75] Inventor: Tsuyoshi Arai, Nagano, Japan

[73] Assignee: Nissei Plastic Industrial Co., Ltd., Nagano, Japan

[21] Appl. No.: 393,167

[22] Filed: Feb. 21, 1995

[30] Foreign Application Priority Data

Apr. 15, 1994 [JP] Japan .................................... 6-077335

[51] Int. Cl.$^6$ ................................................ B29C 45/77
[52] U.S. Cl. ........................................ 264/40.1; 425/150
[58] Field of Search ............................ 264/40.1; 425/150

[56] References Cited

U.S. PATENT DOCUMENTS

| | | | |
|---|---|---|---|
| 4,735,760 | 4/1988 | Kumazaki | 264/40.5 |
| 4,802,267 | 2/1989 | Hosoya | 425/135 |
| 4,820,464 | 4/1989 | Sasaki et al. | 264/40.1 |
| 4,849,678 | 7/1989 | Kamiguchi et al. | 318/572 |
| 4,851,171 | 7/1989 | Shimizu et al. | 264/40.5 |
| 5,238,383 | 8/1994 | Bannai | 425/150 |
| 5,342,559 | 8/1994 | Kamiguchi et al. | 264/40.1 |
| 5,425,906 | 6/1995 | Hashimoto | 264/40.1 |
| 5,482,662 | 1/1996 | Nakamura et al. | 264/40.1 |

*Primary Examiner*—Long V. Le
*Attorney, Agent, or Firm*—Sughrue, Mion, Zinn, Macpeak & Seas

[57] ABSTRACT

In a method of controlling a movable member in a molding machine, a speed of movement of the movable member which is moved by driving device is detected, the speed of movement thus detected, and a deceleration time which is required for decelerating the movable member so that the movable member is stopped or nearly stopped, are utilized to obtain an over-run distance from a braking start position provided for the movable member, the braking start position is set to the over-run distance which is just short of a movement limit position provided for the movable member, and braking control is started for the driving device when the movable member reaches the braking start position, whereby the collision of the movable member against the stationary member is prevented, or, when the former collides with the latter, the impact is less.

3 Claims, 3 Drawing Sheets

METHOD OF CONTROLLING A MOVABLE MEMBER IN A MOLDING MACHINE

BACKGROUND OF THE INVENTION

This invention relates to a-method of controlling a molding machine, and more particularly to a method of controlling a movable member in a molding machine which is applicable, for instance, to the control of a movable member in an injection molding machine which is limited in movement with respect to a stationary member.

In general, a molding machine such as an injection molding machine has movable members such as an injection screw for injecting molten material into the cavity of a metal mold and a movable board on which a movable metal mold is mounted. Those movable members are moved with respect to respective stationary members by mechanical means such as a fluid-pressure-operated actuator or a ball thread mechanism. In the case of the injection screw, the stationary member is a heating cylinder in which the injection screw is set; and in the case of the movable metal mold mounted on the movable board, the stationary member is a stationary metal mold mounted on a stationary board which is set confronted with the movable board.

In the injection molding machine, in order to prevent the collision of the movable member with the stationary member, the movable member is designed as follows: That is, the injection screw is limited in forward stroke so that it is stopped just before the inner surface of the end wall of the heating cylinder. The movable board is decelerated so that its speed is a predetermined value when the movable board approaches the stationary board. The movable board is stopped when it abuts against the stationary board.

More specifically, the injection screw is controlled as follows: First, the injection screw is moved forwardly at a predetermined speed to approach the front end of the forward stroke thereby to inject molten resin into the cavity of the metal mold. When the cavity has been filled with the molten resin, the injection screw is decelerated and moved to the front end of the forward stroke, so that the material injected into the cavity is dowelled through the material remaining between the end of the injection screw and the inner surface of the end wall of the heating cylinder.

The injection screw is normally stopped through the balance of the pressure of the material injected into the metal mold cavity with a predetermined dowelling pressure. When the injection screw is about to move over the front end of the forward stroke, its position is detected, so that it is forcibly stopped.

The aforementioned movable board is controlled as follows: The movable board together with the movable metal mold is moved towards the stationary board at a predetermined speed on which the stationary metal mold has been mounted. When the distance between the movable metal mold and the stationary metal mold reaches a predetermined value; that is, when the movable board approaches the front end of the forward stroke, it is decelerated. Under this condition, the movable board is further moved forwardly so that the movable metal mold is gently abutted against the stationary metal mold, and then they are clamped together under a predetermined pressure.

The conventional injection molding machine thus designed involves the following problems:

In the case where the movable member is the injection screw, the operation of reducing its speed, and the operation of stopping it at the front end of the forward stroke are carried out according to injection screw position data which are determined in advance when driving conditions are set for the injection molding machine.

However, in the case where the material measured is smaller in quantity than a predetermined value, the injection molding machine suffers from the following difficulty. As was described above, in order to inject the material into the metal mold cavity, the injection screw is moved forwardly while being controlled in speed, and when it reaches the set position, it is decelerated, and the pressure control is effected. However, since the material measured is smaller, the quantity of material injected into the metal mold cavity is also smaller than a predetermined value, and accordingly the pressure in the metal mold cavity into which the material has been injected is lower. As a result, the balance is lost which is established between the pressure provided by the material and the pressure acting on the injection screw which has been set for the pressure control. Hence, the injection screw is moved to the front end of the forward stroke before it is sufficiently decelerated.

When, as was described above, the injection screw is moved to the front end of the forward stroke before it is sufficiently decelerated, it is detected, so that the injection screw is forcibly braked. However, the injection screw is not sufficiently decelerated as was described above, and the injection screw is braked with a fixed deceleration rate. Hence, depending on the initial speed of the injection screw at the start of the braking operation, stopping the injection screw is delayed. As a result, the front end of the injection screw collides with the inner surface of the end wall of the heating cylinder, or the front end of the injection ram moving the injection screw forwardly collides with the rear end of the heating cylinder, or the front end of the piston of the injection ram collides with the inner surface of the end wall of the injection cylinder, to stop the injection screw.

The above-described difficulty, the collision of those components, may be involved in the case, too, where the operator has made a mistake in setting the stop position.

Recently, the injection speed has been greatly increased to 800 to 1000 mm/sec when compared with the conventional injection speed ranged from 100 mm/sec to 300 mm/sec. Hence, at the start of the braking operation, the initial speed of the injection screw is higher. Hence, the above-described difficulty is increased in the frequency of occurrence, damaging the machine greatly.

In the case where the movable member is the movable board, almost all the collisions are caused both by an error in setting the deceleration start position and by the fact that the deceleration rate is fixed so that it is impossible to control the variation in initial speed of the movable member at the start of the deceleration. If this difficulty occurs, then the expensive metal mold may be broken.

SUMMARY OF THE INVENTION

In view of the foregoing, an object of the invention is to provide a method of controlling a movable member in an injection molding machine in which, when being moved forwardly, the movable member is positively prevented from colliding with the stationary member.

The foregoing object and other objects of the invention have been achieved by the provision of a method of controlling a movable member in a molding machine in which, according to the invention, a speed of movement of the movable member which is moved by driving means is detected, the speed of movement thus detected, and a deceleration time which is required for decelerating the movable member so that the latter is stopped or nearly stopped, are utilized to obtain an over-run distance from a braking start position provided for the movable member, the braking start position is the over-run distance short of a movement limit position provided for the movable member, and when the movable member reaches the braking start position, braking control is started for the driving means.

In the method, the speed of movement of the movable member, and the deceleration time required for decreasing the speed of movement to a predetermined value are utilized to determine the over-run distance from the position where braking control starts which the movable member travels until the speed of movement of the latter is changed to the predetermined value.

The movement limit position is provided as a position to which the movable member is allowed to move with respect to the stationary member, and the braking start position is set the over-run distance short of the movement limit position thus provided.

When the movable member reaches the braking start position, the braking control is started. Thus, after traveling the over-run distance from the braking start position, the speed of the movable member is decreased to the predetermined value.

The movement limit position is univocally determined for the movable member depending on the capacity of the molding machine, and the over-run distance is determined according to the speed of movement of the movable member. Hence, the over-run distance and the braking start position are determined according to the speed of movement of the movable member, so that the speed of the movable member is positively decreased to the predetermined value before it reaches the movement limit position.

In the case where the movable member is an injection screw, the movement limit position is set slightly short of the position where the injection screw abuts against a heating cylinder in which the injection screw has been inserted. In the case where the movable member is a movable board, the movement limit position is set slightly short of the position where a movable metal mold mounted on the movable board abuts against a stationary metal mold mounted on a stationary board.

Furthermore, in the case where the movable member is the injection screw, the speed of the movable member which has been decelerated is set to zero or a value to stop the movable member immediately. In the case where the movable member is the movable board, the speed is set to a value in a range with which no trouble is caused by the impact provided when the movable metal mold is abutted against the stationary metal mold In the method, the speed of movement, the over-run distance, and the braking start position are continuously and repeatedly obtained while the movable member is being moved.

The calculation of the over-run distance is continuously carried out while the movable member is being moved. Hence, the braking start position is set according to the variation in the speed of movement of the movable member; that is, it is appropriately determined at all times, which prevents the movable member from being braked unnecessarily.

Furthermore in the method, the over-run distance is obtained according to the following expressions (1) and (2):

$$X = (Vf \times T)/2 \quad (1)$$

$$T = Tmin \times (Vf - Vf0)/(Vfmax - Vf0) \quad (2)$$

where X is the over-run distance; Vf is the speed of movement; Vf0 is the speed of the movable member which has been decelerated; T is the time required for changing the speed of movement from Vf to Vf0; Vfmax is the maximum speed of movement of the movable member; and Tmin is the minimum deceleration time required for changing the maximum speed of movement Vfmax to the speed of movement Vf0.

When the movable member is moving at a given speed, the deceleration time is obtained with the minimum deceleration time as a reference which is required for changing the maximum speed of movement to the predetermined value, and, according to the deceleration time thus obtained, a deceleration time is obtained for the given speed of movement.

The calculation of the deceleration time is based on the value (the minimum deceleration time) which is univocally determined according to the capacity of the molding machine. Therefore, the deceleration time is determined with high accuracy. In addition, the over-run distance is also high in accuracy, being calculated according to the deceleration time.

The nature, utility and principle of the invention will be more clearly understood from the following detailed description and the appended claims when read in conjunction with the accompanying drawings.

DESCRIPTION OF THE PREFERRED EMBODIMENTS

Preferred embodiments of the invention will be described with reference to the accompanying drawings.

First Embodiment

A first embodiment of the invention will be described with reference to FIG. 1 in which an example of a method of controlling a movable member in a molding machine is applied to an in-line screw type injection molding machine.

Figure 1:
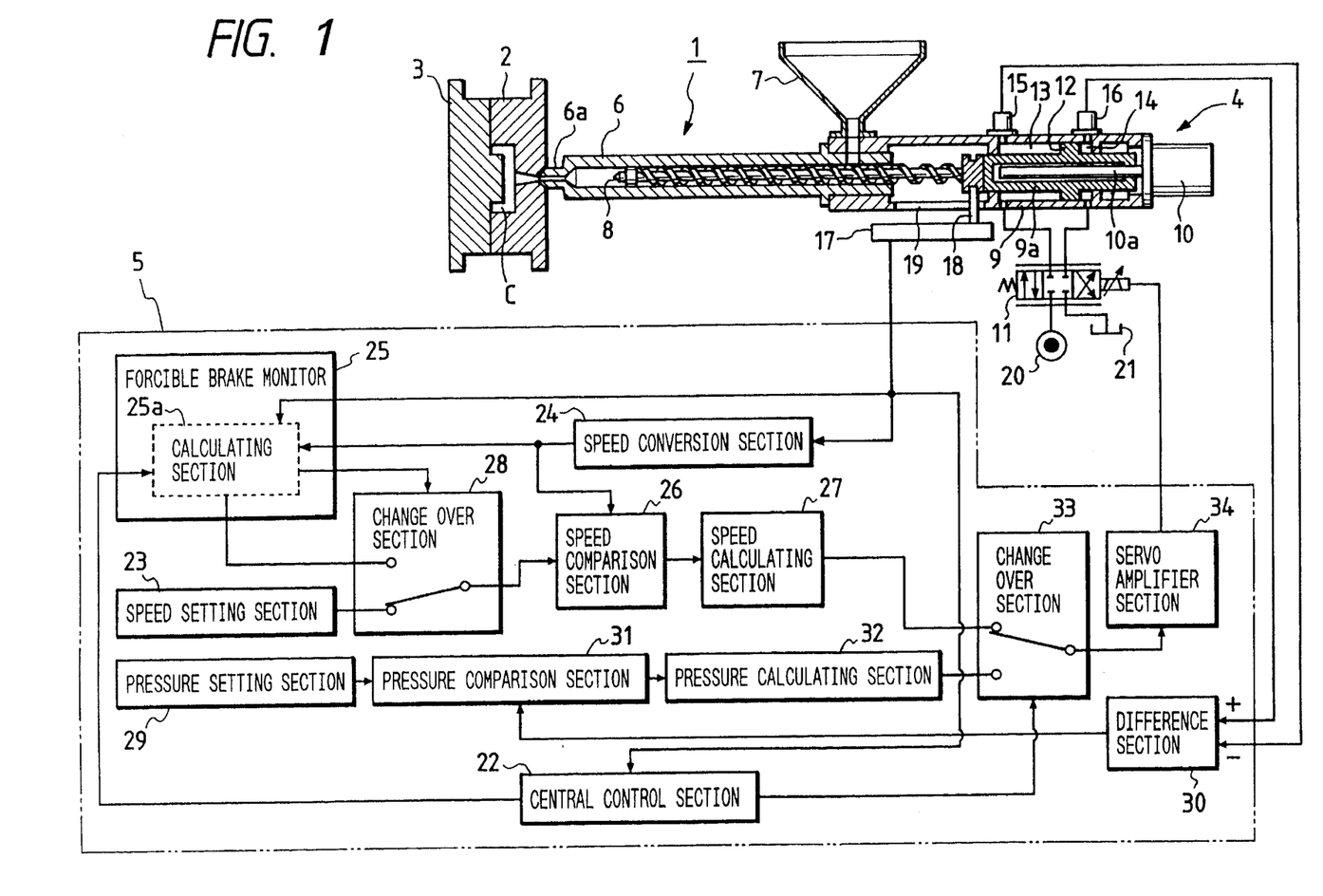
FIG. 1 is an explanatory diagram, partly as a block diagram, for a description of a first embodiment of the invention in which an example of a method of controlling a movable member in a molding machine is applied to an injection molding machine.

In FIG. 1, reference numeral 1 designates the in-line screw type injection molding machine (hereinafter referred to merely as "an injection molding machine 1", when applicable) The injection molding machine 1, as shown in FIG. 1, comprises: a stationary metal mold 2 and a movable metal mold 3 which form a cavity C; an injection unit 4 which is moved to and from the stationary metal mold 2 to inject molten material into the cavity C; and a control unit 5 for controlling the operation of the injection unit 4.

The injection unit 4 comprises: a heating cylinder 6 for melting injection material, the heating cylinder 6 having a nozzle 6a at the end which is an injection hole through which molten material is injected into the cavity C; a hopper 7 communicated with the rear end portion of the heating cylinder 6, to supply the injection material into the heating cylinder 6; an injection screw 8 which is inserted into the heating cylinder 6 from behind, to inject the molten injection material into the nozzle 6a of the heating cylinder 6; a hydraulic cylinder 9 having an injection ram 9a coupled to the injection screw 8, to reciprocate the latter 8 axially; a hydraulic motor 10 mounted on the rear end of the hydraulic cylinder 9, to turn the injection ram 9a; and a servo valve 11 for controlling the supply of an operating oil to the hydraulic cylinder 9.

Splines are formed on the rotary shaft 10a of the hydraulic motor 10. The rotary shaft 10a is engaged with the injection ram 9a through the splines so that the injection ram 9a is turned around its axis while being moved axially.

The injection ram 9a has a piston 12 formed on its outer cylindrical surface in such a manner that the piston 12 surrounds the injection ram 9a and defines a pair of hydraulic chambers 13 and 14 in the hydraulic cylinder 9 which are arranged axially. The operating oil is supplied into those hydraulic chambers 13 and 14 through the servo valve 11. Depending on the difference between the hydraulic pressures in those hydraulic chambers 13 and 14, the injection ram 9a and the injection screw 8 are moved back and forth.

Pressure sensors 15 and 16 are mounted on the hydraulic cylinder 9 to detect the operating oil pressures in the hydraulic chambers 13 and 14, respectively. The front end portion of the injection ram 9a is coupled through an operating piece 18 to a position detector 17 which is provided outside the hydraulic cylinder 9.

The operating piece 18 is extended outside the hydraulic cylinder 9 through a guide hole 19 formed in the side wall of the latter 9, and it is engaged with the front end portion of the injection ram 9a in such a manner that its relative movement in the direction of axis of the injection ram 9a is inhibited but its relative swing about the axis is permitted.

The servo valve 11 is connected to a hydraulic source 20 such as a hydraulic pump, and to a tank 21 for recovering the operating oil discharged from the hydraulic cylinder 9.

The control unit 5 includes: a central control section 22 which stores control programs for the injection molding machine 1; a speed control system for controlling the speed of the injection screw 8; and a pressure control system for controlling the pressure of the injection screw 8.

The speed control system comprises: a speed setting section 23 for setting an injection speed for speed control; a speed conversion section 24 which calculates the speed of the injection screw 8 according to the output signal of the position detector 17, and outputs the speed data as a feedback signal; a speed comparison section 26 which compares the feedback signal from the speed conversion section 24 with a speed signal from the aforementioned speed setting section 23 or with a speed signal from a forcible brake monitor 25 (describe later); a speed calculating section 27 which corrects the speed according to the result of comparison in the speed comparison section, and outputs the result of correction; the forcible brake monitor 25 which, basing on a position signal provided by the position detector 17, performs braking control for the injection screw 8 according to a program given by the central control section 22; and a change-over section 28 which is operated according to an output signal of a calculating section 25a provided in the forcible brake monitor 25, to selectively apply the speed signal from the brake monitor 25 and the speed signal from the speed setting section to the speed comparison section 26.

The pressure control system comprises: a pressure setting section 29 for setting a pressure for pressure control; a difference section 30 which is connected to the aforementioned pressure sensors 15 and 6, to detect the difference between the pressures of the hydraulic chambers 13 and 14 thereby to output as a feedback signal a signal representing the injection pressure of the hydraulic cylinder 9; a pressure comparison section 31 for comparing the feed back signal from the difference section 30 with the output signal of the pressure setting section 29; and a pressure calculating section 32 for performing pressure correction according to the result of comparison by the pressure comparison section 31.

The speed control system or the pressure control system is selected by a change-over section 33 which is operated by the central control section 22. The change-over section 33 is connected to the servo valve 11 through a servo amplifier section 34 which is adapted to amplify a drive signal which is outputted by the speed calculating section 27 in the speed control system or by the pressure calculating section 32 in the pressure control system.

Now, the operation of the injection molding machine thus constructed, and the control method of the invention will be described.

First, an amount of injection of molding material is set, and an injection speed is set by the speed setting section 23, and an injection pressure is set by the pressure setting section 29. Furthermore, other various conditions such as for instance temperature are set, and injection material is measured.

For the measurement of injection material, the injection screw 8 is turned by the hydraulic motor 10 with a predetermined back pressure applied thereto by the hydraulic cylinder 9.

More specifically, as the injection screw 8 turns, the injection material is drawn from the hopper 7 into the heating cylinder 6, and moved towards the front end of the heating cylinder 6. The injection material, while being moved in this manner, is heated and molten by the heating cylinder 6, and held between the inner surface of the front end wall of the heating cylinder 6 and the front end of the injection screw 8.

As the molten material is sent into the front portion of the heating cylinder 6, the pressure of the molten material is gradually increased, as a result of which the injection screw 8 is moved backwardly against the back pressure. When the injection screw 8 is retracted to a predetermined position, a predetermined amount of molten material is stored in front of the injection screw 8 in the heating cylinder. Thus, the injection material has been measured.

Under this condition, an injection process is carried out according to the program stored in the central control section 22.

At the start of the injection process, the speed comparison section 26 is connected to the speed setting section 23 through the change-over section 28, while the speed control system is connected to the servo valve 11 through the change-over section 33.

In the injection process, first the speed calculating section 27 applies an output signal through the servo amplifier section 34 to the servo valve 11 according to the speed data set by the speed setting section 23, so that, in the hydraulic cylinder 9, the pressure in the hydraulic chamber 14 is increased. As a result, the injection screw 8 is moved forwardly by the injection ram 9a, so that the molten material located in front of the injection screw 8 is injected into the metal mold.

In the injection process, the position of the injection screw 8 is detected by the position detector 17 at all times, and according to the position data provided by the position detector 17 the actual speed of the injection screw 8 is calculated by the speed converter section 24, and the actual speed thus calculated is applied, as a feedback signal, to the speed comparison section 26.

In the speed comparison section 26, the actual speed thus fed back is compared with an aimed speed input by the speed setting section 23. When those speeds are different, a speed correction signal is formed and applied through the change-over section 33 to the servo amplifier section 34, where it is amplified, and applied, as a drive signal, to the servo valve 11. As a result, the injection screw 8 is moved forwardly at the set speed to inject the molten material into the metal molds 2 and 3.

On the other hand, the position signal output by the position detector 17, and the speed signal provided by the speed conversion section 24 are applied to the calculating section 25a in the forcible brake monitor 25. The position signal is further applied to the central control section 22.

When the injection screw 8 reaches the predetermined position, the central control section 22 applies a drive signal to the change-over section 33, so that the speed control system is disconnected from the servo amplifier section 34, and instead the pressure control system is connected thereto. Thus, the pressure control is effected for the injection screw 8.

In the pressure control, in the pressure comparison section 31 a set pressure provided in correspondence to the forward position of the injection screw 8 is compared with the actual pressure which is detected by the pressure sensors 15 and 16 and the difference section 30 and applied to the injection screw 8 by the hydraulic pressure 9. According to the result of comparison, the pressure calculating section 32 calculates a correction value for the amount of operation of the servo valve 11, to provide a correction signal. The correction signal is applied through the servo amplifier section 34 to the servo valve 11, to control the pressure applied to the injection screw 8.

On the other hand, the calculating section 25a in the forcible brake monitor 25 receives the position data of the injection screw 8 from the position detector 17 and the speed data from the speed conversion section 24. That is, the calculating section 25a monitors continuously to prevent the injection screw 8 from being moved excessively forwardly and to perform braking control to lessen the impact at the collision of the injection screw 8 with other components.

That is, the calculating section 25a utilizes the speed of movement of the injection screw 8 and the deceleration time required for decreasing the speed of the injection screw 8 until the latter 8 is stopped or nearly stopped, to obtain an over-run distance from a braking start position for the injection screw 8, and sets the braking start position for the injection screw 8 at a point which is the over-run distance short of the movement limit position of the injection screw 8, and switches the control of the hydraulic cylinder 9 to the braking control when the injection screw 8 reaches the braking start position.

More specifically, if it is assumed that the over-run distance provided for the injection screw 8 is represented by X, then the over-run distance X can be obtained from the following Equations (1) and (2):

$$X = (Vf \times T)/2 \quad (1)$$

$$T = Tmin \times (Vf - Vf0)/(Vfmax - Vf0) \quad (2)$$

where Vf is a speed of movement of the injection screw 8; Vf0 is a speed of the injection screw 8 decelerated; T is the time required from changing the speed of movement from Vf to Vf0; Vfmax is the maximum speed of movement of the injection screw 8; and Tmin is the minimum deceleration time required for changing the maximum speed of movement Vfmax to the speed of movement Vf0.

The maximum speed of movement Vfmax is the highest speed at which the injection screw 8 is moved by the injection molding machine 1, and it is substantially constant being coherent to the machine.

The minimum deceleration time Tmin is the time required when the deceleration capacity of the injection molding machine is maximally used to reduce the maximum speed of movement Vfmax to a predetermined speed Vf0, for instance zero (0). The minimum deceleration time Tmin is also substantially constant being coherent to the machine 1.

Hence, the ratio of the deceleration time T required for reducing a speed of movement Vf to a predetermined speed Vf0 with the minimum deceleration time Tmin is proportional to the ratio of the speed of movement Vf with the maximum speed Vfmax as indicated by Equation (2) above.

When the time T required for reducing the speed of movement Vf to the predetermined speed of movement Vf0 is obtained in the above-described manner, then the over-run distance X (between the position where the braking operation starts and the position where the predetermined speed is obtained) is the product of Vf0 and T as indicated in Equation (1) above.

The movement limit position of the injection screw 8 has been stored in the calculating section 25a of the forcible brake monitor 25. The movement limit position is so set that a small gap is formed between the front end of the injection screw 8 and the inner surface of the end wall of the heating cylinder 6.

That is, the calculating section 25a utilizes the speed of movement Vf of the injection screw 8 which is provided by the speed conversion section 24 to calculate an over-run distance X corresponding to the speed of movement Vf, and utilizes the over-run distance X thus calculated and the preset movement limit position, to set a braking start position.

When the injection screw 8 reaches the braking start position, the position detector 17 detects it and applies the corresponding position data to the central control section 22 and the calculating section 25a. In response to the position data, the central control section 22 operates the change-over section 33 so that the speed control system is connected to the servo amplifier section 34. At the same time, the calculating section 25a operates the change-over section 28 so that the calculating section 25a is connected to the speed comparison section 26.

As a result, the calculating section 25a applies a speed signal, namely, a deceleration signal to the speed comparison section 26, so that braking control is started for the injection screw 8.

That is, the speed of movement of the injection screw 8 is fed back to the speed comparison section 26 through the position detector 17 and the speed conversion section 24, so that the braking control is effected for the injection screw 8.

Since the distance between the braking start position and the movement limit position is the over-run distance X, the injection screw 8 is stopped after being moved the over-run distance X from the braking start position. Hence, the injection screw 8 is positively stopped at the movement limit position. If, in this case, the predetermined speed Vf0 is zero (0), then the injection screw 8 is prevented from striking against the heating cylinder 6 because, as was described before, the movement limit position has been so set that the gap is formed between the injection screw 8 and the heating cylinder 6.

In the embodiment, the over-run distance X is continuously calculated in response to the speed of movement of the injection screw 8. Therefore, as the speed of movement Vf of the injection screw 8 is decreased by the above-described deceleration control, the braking start position is shifted gradually towards the movement limit position, and the speed of movement of the injection screw is the predetermined value Vf0 when it reaches the movement limit position.

On the other hand, the movement limit position may be set where the front end of the injection screw 8 is brought into contact with the heating cylinder, or the predetermined speed Vf0 may be set to around zero (0). In this case, the injection screw 8 is stopped by being abutted against the heating cylinder 6 at a very slow speed.

Thus, in any case, the injection screw 8 and other components are prevented from damage.

In the case where the injection material is correctly measured, in the rear half of the pressure control the injection screw 8 is decelerated by the pressure of the material existing in the front portion of the heating cylinder 6; that is, it is sufficiently decelerated before reaching the braking start position. Thus, in the case where the injection screw 8 is operated correctly, the braking control is not started, thus not adversely affecting the molding conditions.

Second Embodiment

A second embodiment of the invention, in which another example of the control method is applied to a mold clamping device will be described with reference to FIGS. 2 through 4, in which parts corresponding functionally to those which have been described with reference to FIG. 1 are therefore designated by the same reference numerals or characters.

In the second embodiment, control is given to the movement of a movable metal mold 3 in an operation of opening and closing a metal mold unit which comprises the movable metal mold 3 and a stationary metal mold 2.

The stationary metal mold 2 is mounted on a stationary board 40 secured to the base of the injection molding machine 1, and the movable metal mold 3 is mounted on a movable board 41 which is slidably held by a tie bar or the like which is provided between the base and the stationary board 40, so that the two metal molds 2 and 3 are confronted with each other and the movable metal mold 3 can be moved to and from the stationary metal mold 2.

A position sensor 42 is connected to the movable board 41 to detect the position of the latter 41. The stationary board 40 and the movable board 42 and cylinder means (described later) for moving the movable metal mold 3 to open and close the metal mold unit, forms a mold clamping device 43.

The cylinder means comprises: a mold clamping cylinder 45 in which a mold clamping ram 44 fixedly secured to the movable board 41 is slidably fitted; a quick traverse cylinder 46 provided in the mold clamping cylinder 45; a control valve (or an opening and closing valve) for controlling the supply of operating oil to the mold clamping cylinder 45 and the quick traverse cylinder 46; a servo valve 48, a mold opening and closing valve 49, and a control unit 50 for controlling the operations of those valves 47 through 49.

The inside of the mold clamping cylinder 45 is divided into a first hydraulic chamber 45a and a second hydraulic chamber 45b by the mold clamping ram 44. By supplying the operating oil into the first hydraulic chamber 45a, the mold clamping ram 44 is moved outwardly; that is, the movable board 41 integral with the former 44 is moved outwardly; i.e., in a mold closing (or clamping) direction. On the other hand, by supplying the operating oil into the second hydraulic chamber 45b, the mold clamping arm 44 is moved inwardly; that is, the movable board 41 is moved inwardly; i.e., in a mold opening direction.

The mold clamping cylinder 45 has a pressure sensor 51 to detect the pressure of the first hydraulic chamber 45a.

The quick traverse cylinder 46 is integral with the mold clamping cylinder 45, and the mold clamping ram 44 is slidably mounted on the quick traverse cylinder 46, thus forming a hydraulic chamber 46a between the molding clamping ram 44 and the quick traverse cylinder 46. By supplying the operating oil into the hydraulic chamber 46a, the mold clamping ram 44 is moved in the mold closing (clamping) direction. The volume of the hydraulic chamber 46a is smaller than that of the first hydraulic first chamber 45a. Hence, by supplying the operating oil into the hydraulic chamber 46a, the mold clamping ram 44 is moved at high speed.

The mold opening and closing valve 49 is connected to an hydraulic pump 54 adapted to pressure the operating oil, and to an operating-oil tank 55 which recovers and stores the operating oil discharged from the mold clamping device 43. Thus, the valve 49 operates to control the supply of operating oil from the hydraulic pump 54 to the servo valve 48, and leads the operating oil into the operating-oil tank 55 which is recovered through the servo valve 48.

The servo valve 48 is connected to the second hydraulic chamber 45b of the mold clamping cylinder 45 and to the hydraulic chamber 46a of the quick traverse cylinder 46. By supplying the operating oil selectively to the hydraulic chamber 45b or 46a, the mold clamping ram 44 is moved in the mold clamping (closing) direction or in the mold opening direction. In addition, by adjusting the pressures for supplying the operating oil to the hydraulic chambers 45b and 46a, the speed of movement of the mold clamping ram 44 can be changed.

The control valve 47 connected to the servo valve 48 is operated in the mold clamping operation as follows: That is, it leads the operating oil into the first hydraulic chamber 45a of the mold clamping cylinder 45 which is supplied from the servo valve 48. And, in the mold opening operation, the valve 47 leads the operating oil from the first hydraulic chamber 45a into the operating-oil tank 55 through the mold clamping cylinder 45 and the mold opening and closing valve 49.

When the operating oil is supplied into the first hydraulic chamber 45a of the mold clamping cylinder 45 through the control valve 47, the pressure provided in the hydraulic chamber 46a of the quick traverse cylinder 46 and the pressure provided in the first hydraulic chamber 46a act on the mold clamping ram 44, so that the metal molds 2 and 3 are joined together under a pressure high enough for injection molding.

Figure 2:
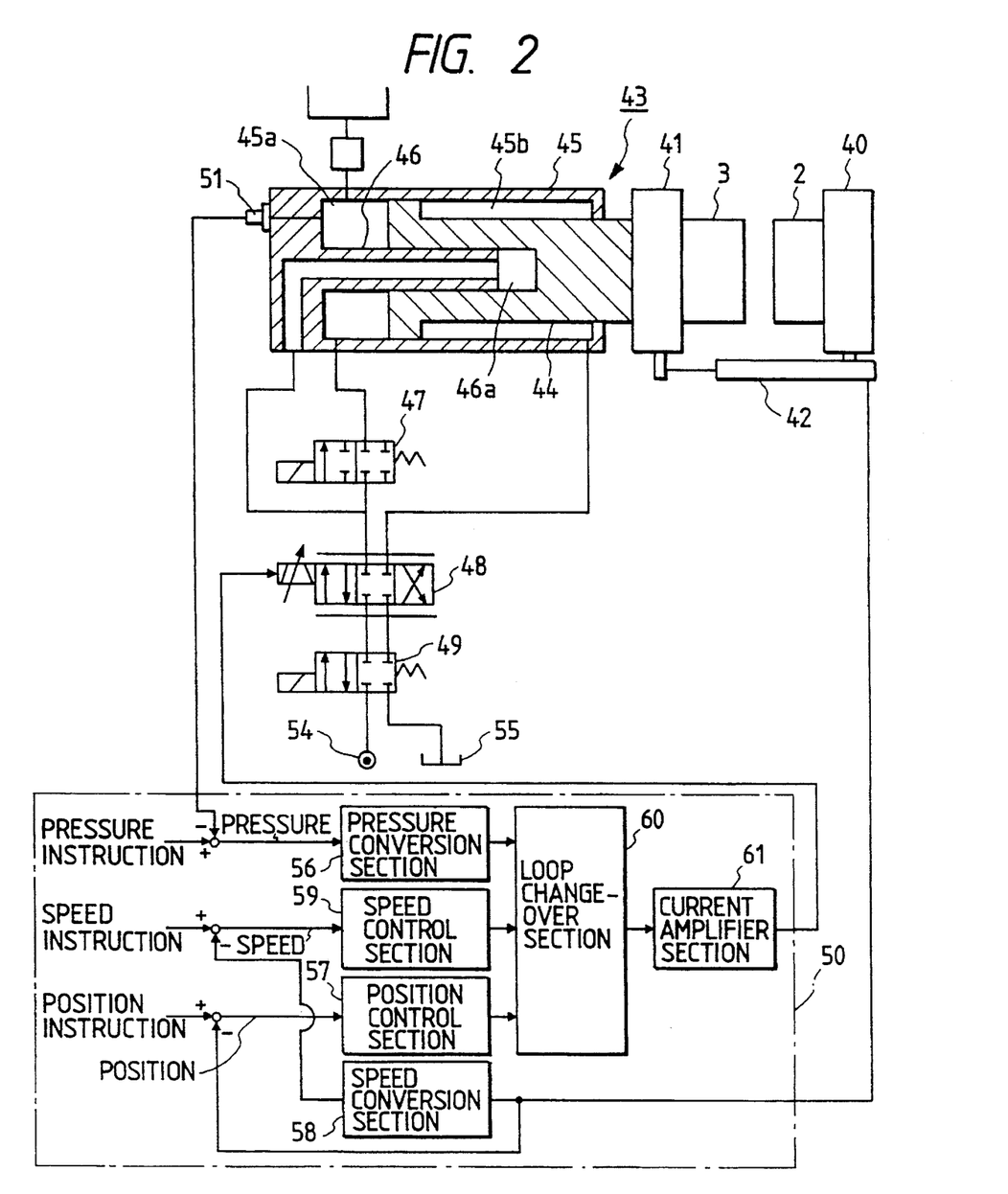
FIG. 2 is also an explanatory diagram, partly as a block diagram, for a description of a second embodiment of the invention in which another example of the method is applied to a mold clamping device.

The control unit 50, as shown in FIG. 2, comprises: a pressure control section 56 which feedback-controls the operation of the servo valve 48 according to the comparison of a pressure signal fed back from the pressure sensor 51 coupled to the first hydraulic chamber 45a of the mold clamping cylinder 45 with a pressure instruction input; a position control section 57 which feedback-controls the operation of the servo valve 48 according to the comparison of a position signal provided by the position sensor 42 with a position instruction inputted; a speed conversion section 58 which calculates the speed of movement of the movable board 41 according to the aforementioned position signal; a speed control section 59 which feedback-controls the operation of the servo valve 48 according to the comparison of a speed signal provided by the speed conversion section 58 with a speed instruction inputted; a loop change-over section 60 for switching the control operations of those control sections 56, 57 and 59 over to one another; and a current amplifier section 61 for amplifying the control signal provided through the loop change-over section.

Now, the control method for the movable board 41 in the mold clamping device thus constructed will be described.

First, a mold clamping operation will be described.

Upon start of the mold clamping operation, the loop change-over section 60 selects the speed control, and the control valve is placed in "off" state, while the mold opening and closing valve 49 is operated to lead the operating oil to the servo valve 48 which is supplied from the hydraulic pump 54. At the same time, the servo valve 48 is operated by the control signal from the speed control section 59, so that the operating oil is supplied into the hydraulic chamber 46a of the quick traverse cylinder 46.

As a result, the mold clamping ram 44 is moved in the mold clamping direction at high speed; that is, the movable board 41 together with the movable metal mold 3 is moved towards the stationary metal mold 2. The speed of movement of the movable board 41 is fed back through the position sensor 42 and the speed conversion section 58, so that the operation of the servo valve 48 is so controlled that, in the speed control section 49, the speed of movement of the movable board 41 be a predetermined speed which is set by the speed instruction (corresponding to a high-speed mold clamping mode 1 indicated in FIG. 3).

When the movable board 41 reaches a first deceleration start position 1, deceleration control is effected so that the movable board 41 is decelerated. The deceleration control is carried out under the following condition:

A distance Xmc required for deceleration is calculated according to the following Equation (3):

$$Xmc=(Vf-Vf0)/2\times T \qquad (3)$$

where Vf is the present speed; Vf0 is the speed decreased, and T is the time required for decreasing the present speed Vf to the value Vf0.

And when the distance Xmc, the position Xs where the speed must be changed to Vf0 (indicated as a low-speed mold clamping position in FIG. 3) and the present position P satisfy the following Equation (4), the deceleration control is started.

$$P \leq Xmc+Xs \qquad (4)$$

In other words, the position P where Equation (4) is satisfied is the first deceleration start position 1.

The present speed Vf and the decreased speed Vf0 obtained during the mold clamping operation are utilized to calculate the distance Xmc required for deceleration. When the movable board 41 reaches the position which is set the distance Xmc short of the position Xs where the speed must be Vf0, the deceleration control is started.

Known values, namely, the deceleration rate which is univocally determined from the capacity of deceleration of the mold clamping device 43, the present speed, and a target speed are utilized to provide the distance Xmc before the first deceleration start position 1. Hence, with the first deceleration start position 1 set according to Equation 4, the speed is positively decreased to Vf0 before the movable board 42 reaches the position Xs where the speed must be Vf0.

In the case where the target speed Vf0 and the position Xs are fixed, the first deceleration start position 1 is determined according to the present speed Vf which is detected before the deceleration starts. Hence, the higher the present speed Vf, the longer the distance Xmc; or the lower the present speed Vf, the shorter the distance Xmc.

Thus, in the second embodiment, too, the deceleration start position 1 is automatically set best according to the present speed Vf of the movable board 41, and the latter 41 is positively decelerated at the predetermined position.

In the case where a second high-speed mold clamping mode 2 is employed to move the movable board 41 which is slower than the aforementioned first high-speed mold clamping mode 1, a second deceleration start position 2 is set closer to the low-speed mold clamping position Xs, and the deceleration control is started at the second deceleration start position 2. In the embodiment, the deceleration is made according to a linear deceleration curve (or deceleration region) A in the high-speed mold clamping mode 1.

The reason why the two reduction curves are linear is that the deceleration rate of the mold clamping device 43 is fixed, and the position where the final deceleration speed Vf0 is obtained is also fixed.

In the embodiment, the movable board 41, after being decelerated to the above-described value Vf0, is further moved in the mold clamping direction at that speed Vf0. Hence, the movement of the movable board 41 is stopped when the movable metal mold 3 mounted on the movable board 41 abuts against the stationary metal mold 2 at the low speed.

This low-speed movement region B is provided for protection of a guide pin and others provided for the metal mold, and the distance of movement is suitably determined depending on the kind of the metal mold.

After the metal molds 2 and 3 have been engaged with each other in the above-described manner, the loop change-over section 60 is operated to select the pressure control for the mold clamping device 43, and the control valve 47 is operated so that the servo valve 48 is communicated with the first hydraulic chamber 45a of the mold clamping cylinder 45. As a result, a part of the operating oil from the servo valve 48 is supplied into the first hydraulic chamber 45a, so that great pressure is applied to the mold clamping ram 44.

At the same time, the pressure of the operating oil in the first hydraulic chamber 45a is fed back to the control unit 50 with the aid of the pressure sensor 51, while the operation of the servo valve 48 is controlled according to the control signal outputted by the pressure control section 56. Thus, the feedback control of the mold clamping pressure of the metal molds 2 and 3 has been achieved.

Figure 3:
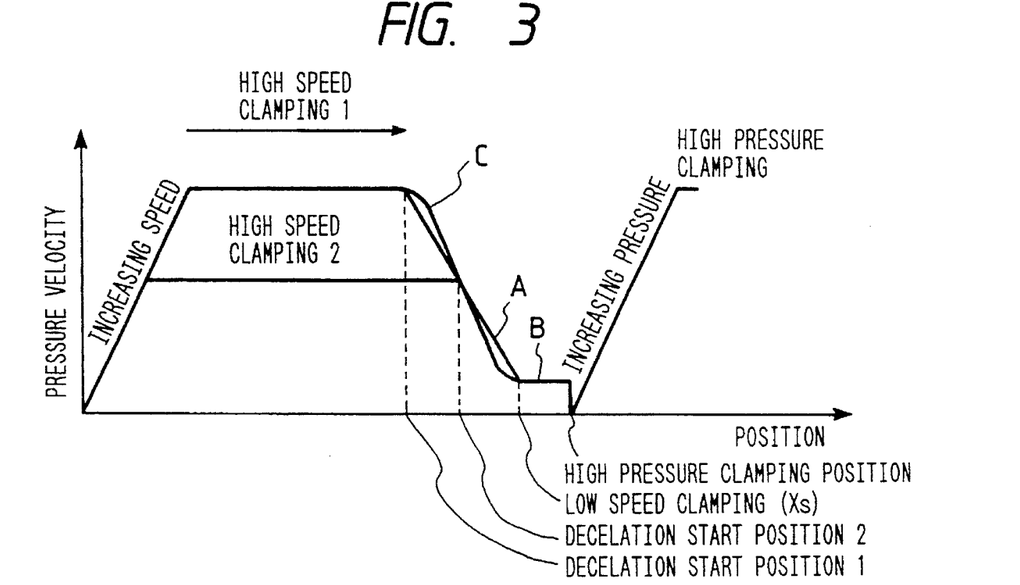
FIG. 3 is a graphical representation indicating relationships between speed, pressure and position in a mold clamping operation of a movable board in the mold clamping device.

The transition of the deceleration region A to the low-speed movement region B may be made smooth; that is, the device may be so designed that an S-shaped deceleration curve as indicated at C in FIG. 3 is employed.

The control method of the invention may be applied to an operation of opening the metal mold unit moving the movable metal mold 3 away from the stationary metal mold 2.

Figure 4:
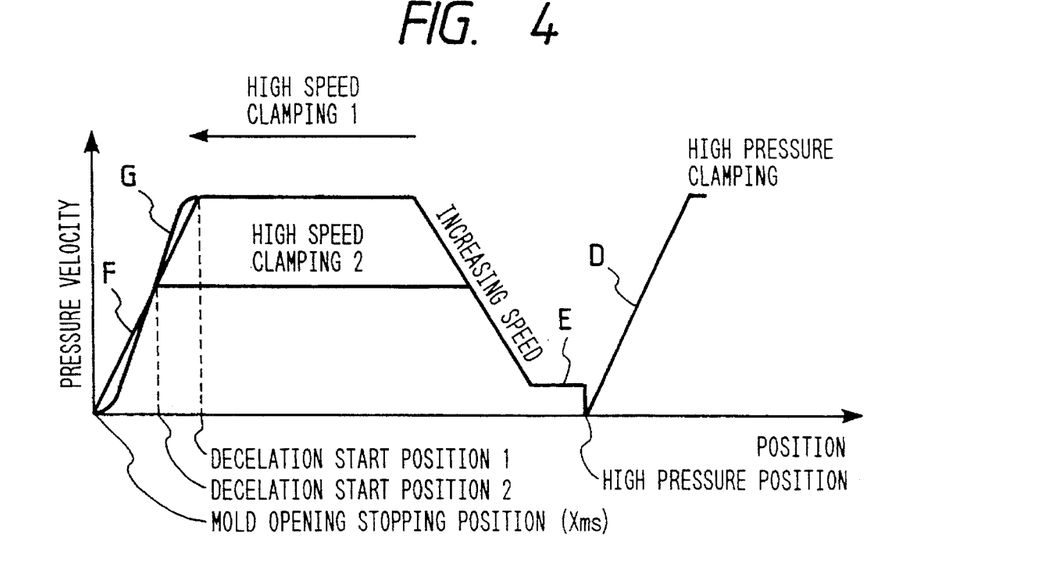
FIG. 4 is a graphical representation indicating relationships between speed, pressure and position in a mold opening operation of the movable board in the mold clamping device.

When the injection of the molten material has been accomplished, the metal molds 2 and 3 are still held clamped under high pressure as indicated in FIG. 4. Under this condition, the servo valve 48 is operated to balance the pressure applied to the mold clamping ram 44 in the mold closing direction with the pressure applied thereto in the mold opening direction; that is, the operating oil in the first hydraulic chamber 45a of the mold clamping cylinder 45 and the operating oil in the hydraulic chamber 46a of the quick traverse cylinder 46 are gradually discharged through the mold opening and closing valve 49 into the operating oil tank 55. Thus, the mold clamping pressure is removed (a pressure removal region D in FIG. 4). This pressure removing operation is also achieved by the feedback control which is performed by the pressure control section according to a pressure signal provided by the first hydraulic chamber 45a.

After the pressure removing operation, the servo valve 48 is operated again, so that the operating oil is supplied into the second hydraulic chamber 45b of the mold clamping cylinder 45, while the operating oil is discharged from the first hydraulic chamber 45a and the hydraulic chamber 46a of the quick traverse cylinder 46 into the operating oil tank 55, whereby the mold clamping ram 44 is moved in the mold opening direction to a predetermined position at low speed (a low-speed mold opening region E in FIG. 4).

After the movable board 41 is moved to a predetermined position at low speed, the quantity of operating oil supplied to the second hydraulic chamber 45b is increased through the servo valve 48. As a result, the mold opening operation is advanced while the movable board 1 is being accelerated to the speed specified by a first high-speed mold opening mode 1 shown in FIG. 4. And the mold opening operation is continued with the movable board 1 being moved at the speed specified by the first high-speed mold opening mode 1.

When the movable board 1 reaches a first deceleration start position 1, it is decelerated. Thus, when the movable board 1 reaches a stop position, namely, a mold-opening stop position Xms, it is stopped. The first deceleration start position 1 is calculated according to the following Equation (5):

$$Xmo = Vf/2 \times T \quad (5)$$

where Vf is the present speed of the movable board in the high-speed mold opening mode 1; Xmo is the distance which the movable board travels until the movable board moving at the speed Vf is stopped; and T is the time required for the movable board's traveling the distance. And the first deceleration start position 1 is determined when the present position P satisfies the following Expression (6):

$$P \geq Xms - Xmo \quad (6)$$

where P is the present position, and Xms is the position where the movable board 41 is stopped.

That is, the deceleration of the movable board is started when the movable board reaches a point which is the distance Xmo short of the stop position in the mold opening direction The first deceleration start position 1 is determined according to the present speed Vf. Therefore, the movable board 1 is positively stopped at the predetermined stop position irrespective of its speed on the same reason as in the molding closing operation.

In this movable board stopping operation, too, a linear deceleration curve F or an S-shaped deceleration curve G as shown in FIG. 4 may be employed for deceleration of the movable board 41.

As was described above, in opening and closing the metal molds 2 and 3, it is possible to change the speed of movement of the movable board so that it set to be a predetermined value when the movable board reaches a predetermined position or to stop the movable board at a predetermined position. This feature permits a high-cycle molding operation, and prevents the metal molds and the guide pin and others from being damaged during the mold clamping operation, and eliminates the difficulty that the deceleration start position is gropingly determined, thus improving the productivity.

In the mold opening operation, the movable metal mold 3 is stopped at the predetermined position with high accuracy. Hence, a machine for taking a molding out of a mold can be accurately positioned with respect to the movable metal mold, and adjustment of the machine can be achieved with ease, which eliminates the difficulty that a molding is damaged when taken out of the mold.

While the invention has been described with reference to its preferred embodiments, it should be noted that the invention is not limited thereto or thereby. That is, they may be changed or modified according to the kind of an injection molding machine employed or the kind of a movable member employed in it. For instance, in the above-described embodiments, the drive means for driving the injection screw 8 or the movable board 41 is the hydraulic cylinder 9; however, the invention is not limited thereto or thereby. That is, the technical concept of the invention is applicable to an injection molding machine in which the drive means is a ball thread mechanism or electrical driving means.

As is apparent from the above description, in the control method of the invention, the speed of movement of the movable member, and the time required for decreasing the speed of movement to a predetermined value are utilized to determine the over-run distance which the movable member travels during the period of time which elapses from the time instant that the braking operation starts until the speed of movement is decreased to the predetermined value. The braking start position is set the over-run distance short of the movement limit position provided for the movable member, so that, when the movable member reaches the braking start position, the braking control is started. Hence, the method has the following effects or merits:

The braking operation is started when the movable member reaches the braking start position. Hence, the speed of movement of the movable member can be so decreased that the latter has the predetermined speed when it has traveled the over-run distance from the braking start position; that is, when the movable member reaches the movement limit position.

The movement limit position is set slightly short of the position where the movable member abuts against the stationary member, and the predetermined speed is set to zero, so that the movable member is stopped before abutting against the stationary member. In the case where the predetermined speed is set to a value nearly zero, the movable member is sufficiently decelerated before reaching the movement limit position, so that its speed of movement is sufficiently low when it collides with the stationary member.

In the case where the movement limit position for the movable member is set where the latter abuts against the stationary member, the speed of movement of the movable member which has been decelerated is set to zero or nearly zero so that the movable member is sufficiently low in the speed of movement when abutting against the stationary member.

Hence, the collision of the movable member against the stationary member is prevented, or when the former collides with the latter, the impact is lessened, whereby the movable member, the stationary member, and other components are protected from damage.

Since the braking start position is determined according to the speed of movement of the movable member, the latter is positively decelerated or stopped before reaching the movement limit position no matter what the speed of movement is. Thus, the method is free from the difficulty that the braking start position is erroneously set.

Sine the deceleration time and the over-run distance are univocally determined according to the capacity of the injection molding machine, the braking start position can be determined with high accuracy.

In addition, the braking operation can be postponed to the very limit of what is permissible. Hence, a high-cycle molding operation can be carried out. In the case where the control method of the invention is applied to a mold opening operation which is performed by moving a movable metal mold, the stop position for the movable metal mold is controlled with high accuracy, so that the machine for taking a molding out of the mold can be accurately positioned with respect to the movable metal mold. Hence, adjustment of the machine can be achieved with easy, and the difficulty is eliminated that the molding is damaged when taken out of the mold.

Furthermore, in the method of the invention, the speed of movement of the movable member, the over-run distance, and the braking start position are continuously determined while the movable member is being moved. That is, the braking control is carried out according to the operating condition of the molding machine, whereby the braking start position can be suitably determined at all times, which prevents the movable member from being braked unnecessarily.

When the movable member is moving at a given speed, the deceleration time is obtained with the minimum deceleration time as a reference which is required for changing the maximum speed of movement to the predetermined value, and according to the deceleration time thus obtained, a deceleration time is obtained for the given speed of movement. Hence, the deceleration time can be calculated on the value (the minimum deceleration time) which is univocally determined according to the capacity of the molding machine so that it is determined with high accuracy. In addition, the over-run distance and the braking start position can be determined with high accuracy, being calculated according to the deceleration time.

While there has been described in connection with the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A method of controlling-a movable member in a molding machine comprising the steps of:

detecting a speed of movement of said movable member which is moved by driving means, calculating an over-run distance from a braking start position of said movable member based upon said speed of movement detected in said detecting step and a deceleration time, corresponding to said speed of movement, which is required for decelerating said movable member so that said movable member is substantially stopped, said braking start position being set to a position which is a calculated distance from a preset movement limit position at which movement of said movable member is terminated, said calculated distance corresponding to said over-run distance minus a predetermined distance, and initiating braking control of said drive means when said movable member reaches said braking start position.

2. The method as claimed in claim 1, further comprising the step of continuously and repeatedly obtaining said speed of movement, said over-run distance, and said braking start position while said movable member is being moved.

3. The method as claimed in claim 2, wherein said calculating step comprises the step of obtaining said over-run distance according to the following expressions (1) and (2):

$$X = (Vf \times T)/2 \tag{1}$$

$$T = Tmin \times (Vf - Vf0)/(Vfmax - Vf0) \tag{2}$$

where X is the over-run distance; Vf is the speed of movement; Vf0 is the speed of said movable member which has been decelerated; T is the time required for changing the speed of movement from Vf to Vf0; Vfmax is the maximum speed of movement of said movable member; and Tmin is the minimum deceleration time required for changing the maximum speed of movement Vfmax to the speed of movement Vf0.

* * * * *